(12) United States Patent
Hori et al.

(10) Patent No.: US 6,845,096 B1
(45) Date of Patent: Jan. 18, 2005

(54) WEB PHONE DIALER SYSTEM APPARATUS AND METHOD

(75) Inventors: Yasunobu Hori, Kawasaki (JP); Hisashi Matsumura, Odawara (JP); Yoshiyuki Sato, Ebina (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/079,157

(22) Filed: May 15, 1998

(51) Int. Cl.[7] .............................................. H04L 12/66
(52) U.S. Cl. ..................................................... 370/352
(58) Field of Search ................................. 370/352, 353, 370/354, 355, 356, 401, 422, 426; 379/88.17, 93.01, 93.09, 93.17, 93.24, 93.25, 100.08, 220, 221, 222, 223, 201

(56) References Cited

U.S. PATENT DOCUMENTS

| | | | | |
|---|---|---|---|---|
| 5,790,649 A | * | 8/1998 | Hiroshige | 379/201 |
| 5,850,433 A | * | 12/1998 | Rondeau | 379/201 |
| 5,991,291 A | * | 11/1999 | Asai et al. | 370/352 |
| 6,091,808 A | * | 7/2000 | Wood et al. | 379/201 |
| 6,526,129 B1 | * | 2/2003 | Beaton et al. | 379/90.01 |

* cited by examiner

Primary Examiner—Kwang B. Yao
(74) Attorney, Agent, or Firm—Antonelli, Terry, Stout & Kraus, LLP

(57) ABSTRACT

A web phone dialer system that can easily transmit a call to a person, even if the telephone number of the person is changed. The web phone dialer system includes a web server, a sending client, and a receiving client each being connected to each other through a network. The web server includes a telephone directory database which stores a database file having a plurality of records each including an assignment, name, and telephone number of a parson operating a receiving client and an IP address, and mail address if the receiving client. The web server in response to an inquiry from a sending client, including at least one of an assignment and name of a person to which communication is to be established, searches the telephone directory database to obtain the telephone number, IP address and mail address of the person. The sending client use the telephone number to call.

20 Claims, 6 Drawing Sheets

| ASSIGNMENT | NAME | IP ADDRESS | TELEPHONE NUMBER | MAIL ADDRESS |
|---|---|---|---|---|
| FACTORY A DESIGN DEPARTMENT | ICHIRO TANAKA | 158.214.XX.XX | 03-XXXX-XXXX | TANAKA@--- |

FIG. 2

WEB PHONE DIALER SYSTEM APPARATUS AND METHOD

BACKGROUND OF THE INVENTION

The present invention relates to a web phone dialer system that links the web system on an Intranet or an Internet with an automatic telephone dialing system. More particularly this invention relates to a web phone dialer system to obtain telephone number, IP address, mail address of receiving clients or operators. The present invention relates to confirm presence/absence of receiving operator.

The present invention also relates to a confirmation system that confirms the presence of operators. In the conventional telephone communication system, when calling a person, one dials the telephone number of the person from a telephone set.

In recent developments, the functions of a personal computer are being harmonized with a telephone function into what is known as a computer telephony integration system which enables the computer to transmit and receive a call. Such a system allows the operator of a computer, the operator is able to phone call from the computer as a process of the work being performed by the operator. More specifically the operator is allowed to dial the telephone number of the party to call while operating the display of the computer. In the conventional system, when calling a party (receiving operator), the sending operator needs to know the telephone number of the party in advance. However, if there occurs a change in the telephone number of the party, or the like, the sending operator can not call the party.

SUMMARY OF THE INVENTION

An object of the present invention is to provide a web phone dialer system whereby the operator can easily call the party even if the telephone number of the party has changed.

In order to accomplish the foregoing object, the web phone dialer system according to the present invention includes a telephone directory database which stores a plurality of records, each having an assignment, name, and telephone number on a web server which searches for a the telephone number corresponding to an assignment and name in the telephone directory database and a plurality of clients connected to the web server through a communication network. Each client contains a telephone dialing unit for controlling the transmission or reception of a call. In this construction, the web server, using the telephone directory database, provides a telephone number of a receiving operator in response to an inquiry from a sending client including an assignment and/or name of an operator using the receiving client. The sending client connects a call to the receiving client by dialing the telephone number provided by the web server using the telephone dialing unit.

According to the foregoing construction, the system searches the telephone number of the party to be called, and thereafter, transmits a call to the receiving client that the party to be called operates. The telephone directory database is controlled to be centralized. Thus the updated telephone number can always be obtained, even if the telephone number of the party is changed. Therefore, the system can easily prevent the operator from calling a wrong number.

According to another aspect of the invention, in the web phone dialer system, the client further includes a presence/absence registration unit to register the presence/absence of the operator on the client, and a presence/absence confirmation unit to confirm the presence/absence of another operator on another client. Each record of the database file of the telephone directory database further includes an IP address. The web server, using the telephone directory database, provides an IP address of a receiving client response to an inquiry from the sending client including the assignment and/or name of the operator using the receiving client. The presence/absence confirmation unit of the sending client confirms the presence/absence of the operator using the receiving client with the presence/absence registration unit of the receiving client.

Thus, using the IP address, provided by the web server, the system can beforehand confirm the presence or absence of the party to be called with the presence/absence confirmation unit of the receiving client. The system can prevent unnecessary calls when the party being called is absent.

According to another aspect of the invention, the system further includes a mail server connected to the communication network, each client further includes a mail transmitter/receiver, and each record of the database file of the telephone directory database further includes a mail address. In this construction, the web server, using the telephone directory database, provides a mail address of a receiving client in response to an inquiry from the sending client including the assignment and/or name of the operator using the receiving client. The mail transmitter/receiver of the sending client transmits mail for the receiving client to the mail server by using the mail address provided by the web server.

According to the foregoing construction, while the party is absent, the system can send mail to the mail address obtained in advance, and communication during absence can easily be made.

BRIEF DESCRIPTION OF THE DRAWINGS

The scope of the present invention will be apparent from the following detailed description, when taken in conjunction with the accompanying drawings, and such detailed description and specific examples, while indicating preferred embodiments of the invention, are given by way of illustration only, since various changes and modifications within the spirit and scope of the invention will become apparent to those skilled in the art from this detailed description, in which:

FIG. 2 is a diagram illustrating the data construction of a telephone directory database used in the web phone dialer system according to one embodiment of the present invention;

DESCRIPTION OF THE PREFERRED EMBODIMENTS

The web phone dialer system according to one embodiment of the present invention will hereafter be described with reference to the accompanying drawings.

Figure 1:
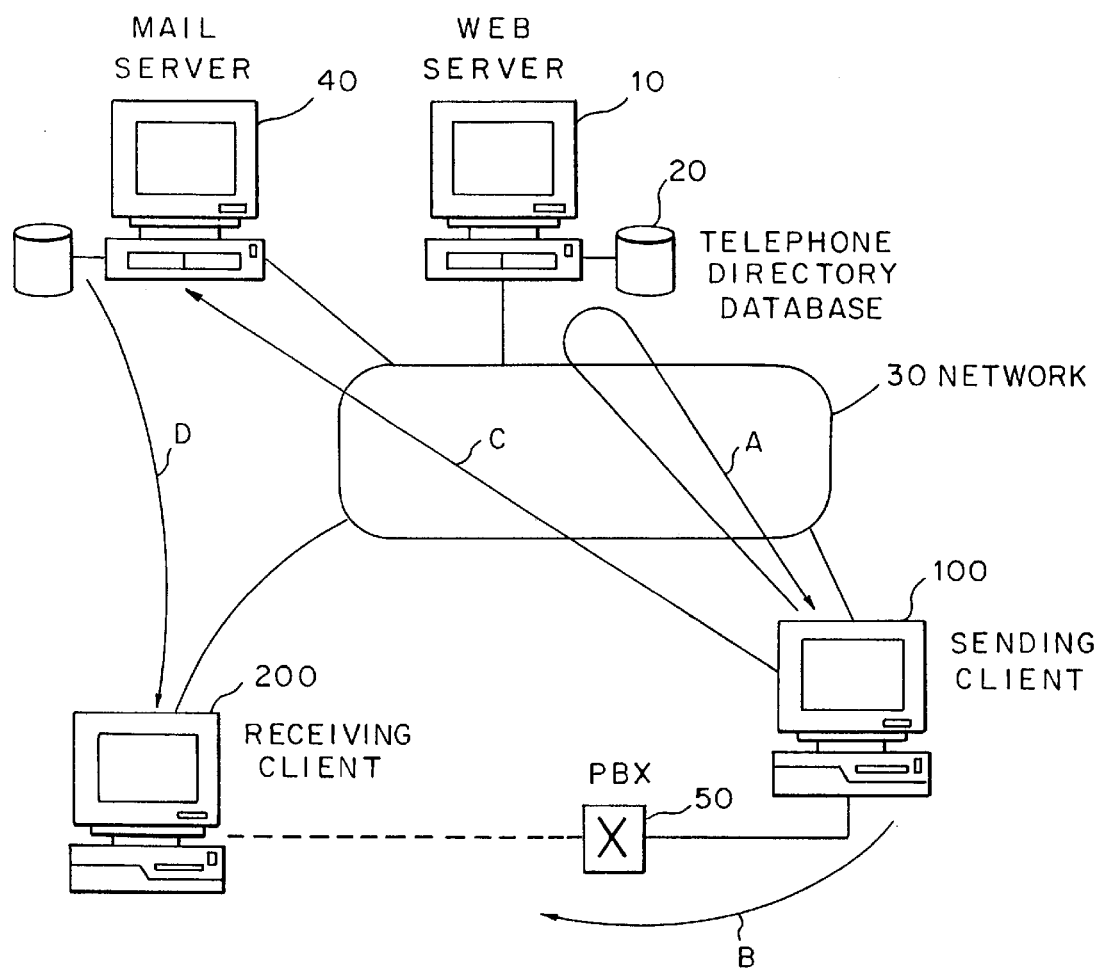
FIG. 1 is a diagram illustrating an overall construction of the web phone dialer system according to the present invention.

First, the overall construction of the web phone dialer system of the embodiment will be described with reference to FIG. 1.

In the description hereunder, the web represents a system that provides information to be visually observed with a feeling of a hypertext. In the web, a computer that stores the information is called a web server, a computer that can search the information is called a web client. The overall construction is known as the web system. Further, the Intranet and the Internet are the communication networks in which computers can communicate with each other using a common protocol.

The web system includes a web server 10, a sending client 100, a receiving client 200, and a mail server 40, a plural of clients, each of which is connected to each other via a network 30.

The web server 10 is provided with a telephone directory database 20. The telephone directory database 20 stores information such as assignments, names, and telephone numbers of individual personnel, and data such as IP addresses, mail addresses, and the like, which will be detailed later with reference to FIG. 2. An Internet protocol address (IP address) is a global network address inherent to a machine used on the Internet. The telephone directory database 20 may be constructed separately from the web server 10.

The sending client 100 and the receiving client 200 are each a computer telephony integration system in which the computer such as personal computer is combined with a telephone function and a telephone call can be transmitted and received from the computer. The sending client 100 is able to access the web server 10 through the network 30, and to search data stored in the telephone directory database 20.

Further, the sending client 100 and the receiving client 200 are connected to each other through a PBX (Private Branch Exchange) 50 being a telephone exchange and a communication line. Therefore, when calling a receiving party, the operator of the sending client 100 rings up the receiving client 200 through the PBX 50, thereby allowing the operator to communicate with the receiving party.

The mail server 40 is able to transmit voice mail transmitted by the sending client 100 through the network 30 to the receiving client 200 through the network 30. Voice mail is a type of mail wherein analog voices are digitized. The digitized data of the voices are filed and transferred by the computer, and the digital data is converted into the analog voice on the receiver side thereby allowing the receiving party to hear the original voices.

Next, a general flow in case of the sending client 100 calling the receiving client 200 will be described briefly. The individual construction and operation of the web server 10, the sending client 100, the receiving client 200, and the mail server 40 will be described later.

First, the sending operator operates the sending client 100 to access the web server 10 to search for the telephone number of the party to be called. Using the telephone directory database 20, the web server 10 obtains the telephone number, IP address, and mail address of the receiving client 200 on the basis of the assignment and name of the party input from the sending client 100. This is represented by arrow A.

Next, the sending client 100 accesses the receiving client 200 through the network 30 using the IP address obtained, and confirms the presence/absence of the operator of the receiving client 200.

When the receiving operator is present, the sending client 100 calls the receiving client 200 through the PBX 50, using the telephone number obtained as represented by arrow B. When the receiving operator is absent, the sending client 100 transmits a voice mail to the mail server 40 through the network 30, using the mail address obtained, as represented by arrow C. When the receiving operator returns, the receiving operator operates the receiving client 200 and obtains the voice mail from the mail server 40 as represented by arrow D. Next, the data construction of the telephone directory database 20 will be described with reference to FIG. 2.

In the telephone directory database 20 a plurality of records are registered. Each record includes an assignment 21 and a name 22 of the operator, an IP address 23 of the computer used by the operator, a telephone number 24, and a mail address 25. In the assignment 21 are registered "Factory A, design department" as illustrated. In the name 22 are registered names such as "Ichiro Tanaka". The IP address 23 is registered in a form of "158. 214. xx. xx". The telephone number 24 is registered in a form of "03-xxxx-xxxx". The mail address 15 is registered in a form of "tanaka @NNN".

These data are controlled to be centralized for each site (for example, for each department). Therefore, if there is any change in the assignment, IP address, telephone number, mail address, and the like with respect to "Ichiro Tanaka", the record is modified each time, and the updated data are registered.

Figure 3:
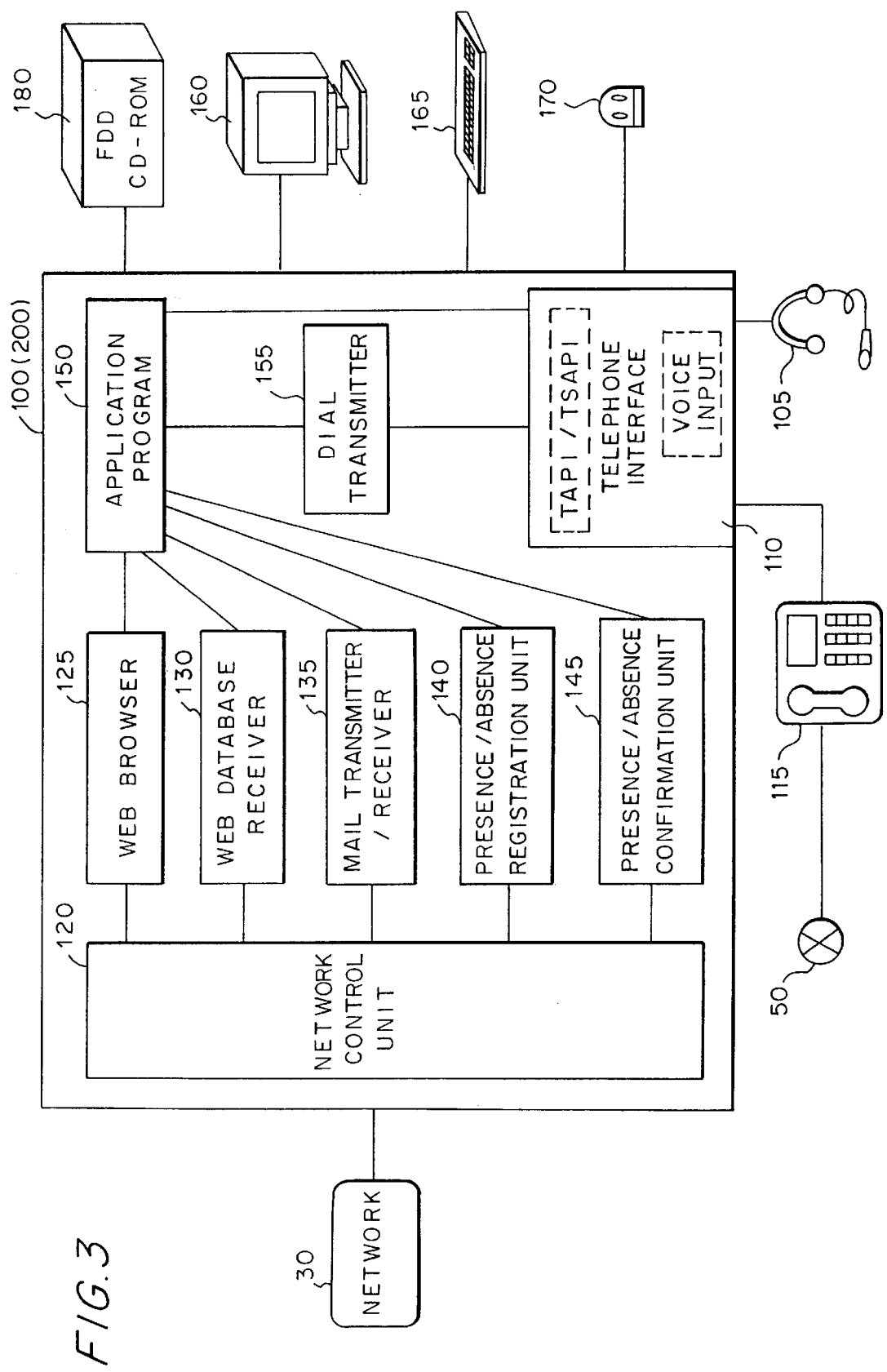
FIG. 3 is a block diagram illustrating a construction of a client used in the web phone dialer system according to one embodiment of the present invention.

Next, the configuration of the sending client 100 will be described with reference to FIG. 3. The receiving client 200 is also configured in the same manner as the sending client 100. Thus only the sending client 100 will be described. The sending client 100 contains a telephone interface 110 that possesses a telephone dialing function to transmit a call to the receiving client 200 from a TAPI or TSAPI interface and a voice input function to input voices from a handset 105. Here, the TAPI is the abbreviation for Telephony Application Program Interface, and the TSAPI is the abbreviation for Telephony Service Application Program Interface. Both are the program interfaces that can control transmission and reception of a call from/to a computer to/from a telephone.

The telephone interface 110 is able to connect, using the telephone dialing function, the sending client 100 to the receiving client 200 corresponding to the telephone number of the party to call through a telephone set 115 and the PBX 50. A network control unit 120 connects a web browser 125, a web database receiver 130, a mail transmitter/receiver 135, a presence/absence registration unit 140, and a presence/absence confirmation unit 145 of the sending client 100 to the network 30.

The web browser 125 accesses the web server 10. The web database receiver 130 receives information of the receiving operator, stored in the telephone directory database 20, transmitted from the web server 10. The mail transmitter/receiver 135 transmits or receives voice mail in case the operator is absent. The presence/absence registration unit 140 registers "presence" when the sending operator is present at the sending client by an input device and registers "absence" when the sending operator is absent. The presence/absence confirmation unit 145 is to confirm the presence or absence of the receiving operator with the receiving client 200. The presence/absence confirmation unit 145 accesses the presence/absence registration unit 140 of the receiving client 200, obtains the information on the presence or absence of the operator, and thereby confirms the presence or absence of the operator of the receiving client 200. The web browser 125, web database receiver 130, mail transmitter/receiver 135, presence/absence registration unit 140, and presence/absence confirmation unit 145 are controlled by an application program 150. A dial transmitter 155 receives the telephone number of the receiving client 200 through the application program 150, and transmits the number to be dialed to the telephone interface 110.

Figure 4:
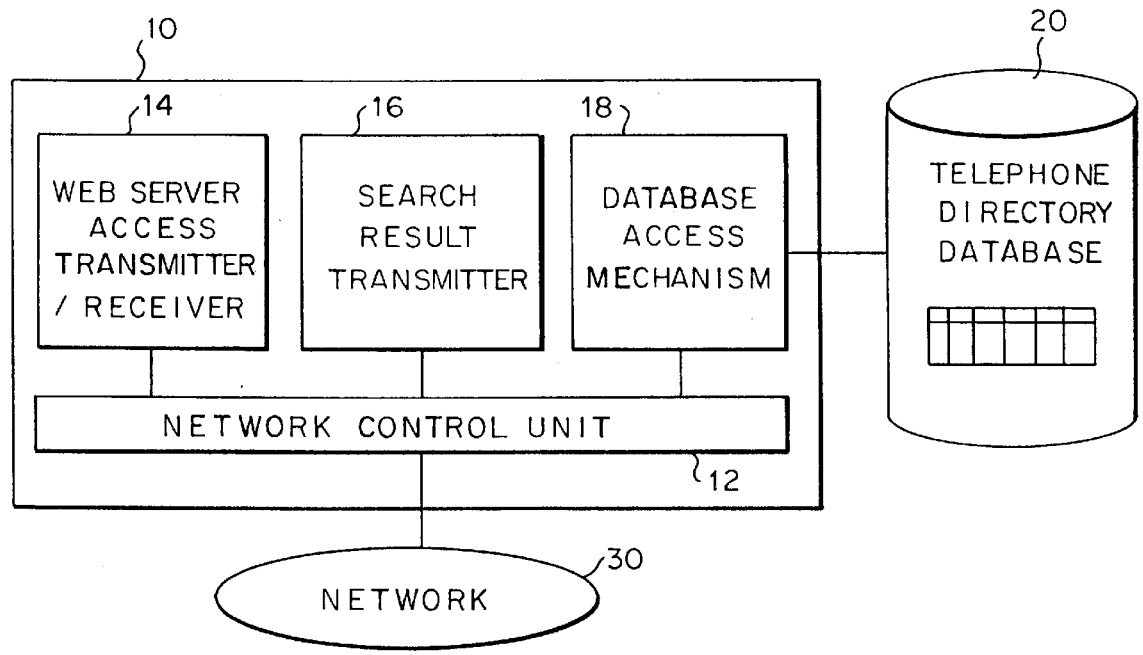
FIG. 4 is a block diagram illustrating a construction of a web server used in the web phone dialer system according to one embodiment of the present invention.
Figure 6:
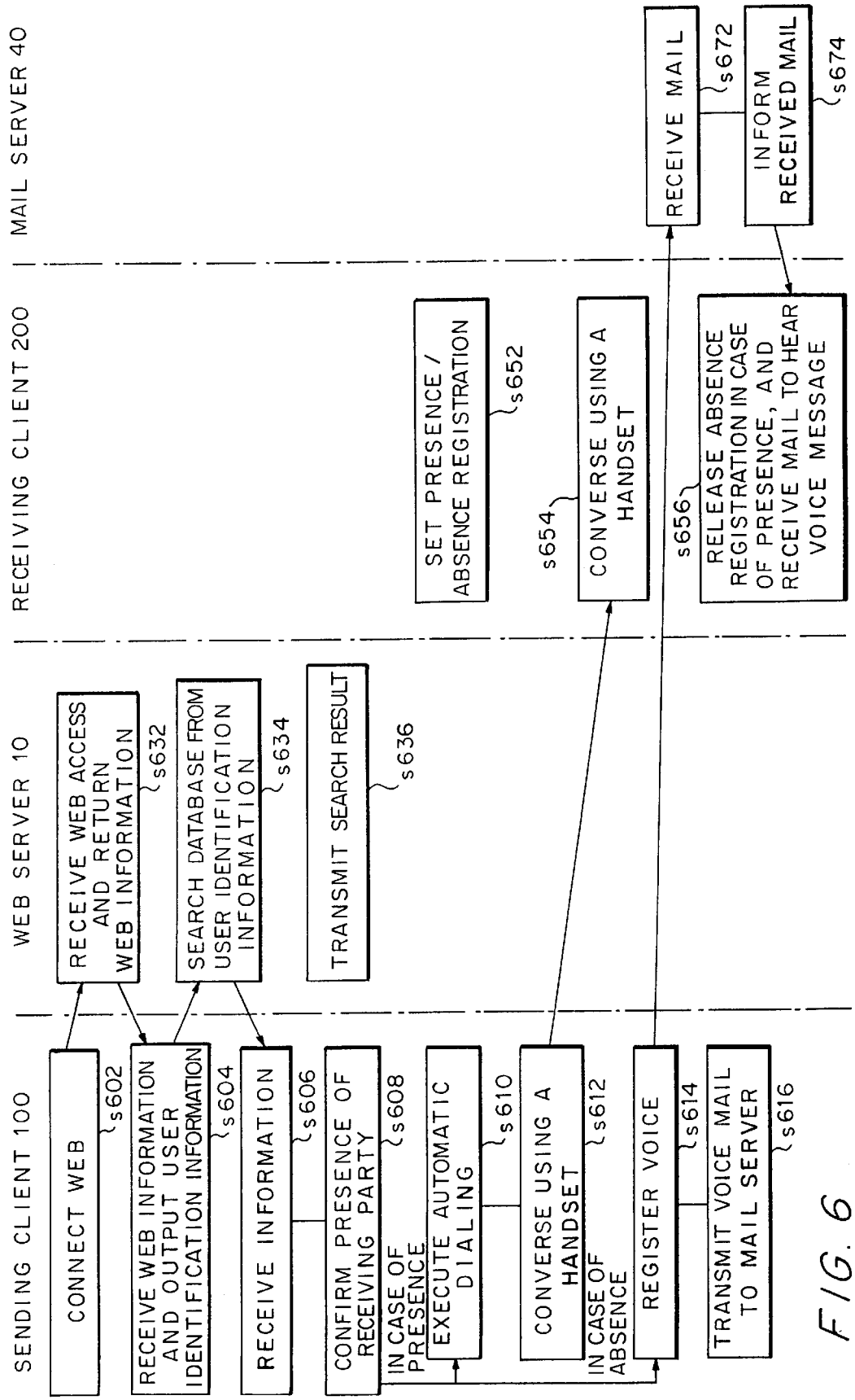
FIG. 6 is a flow chart illustrating the operation of the web phone dialer system according to one embodiment of the present invention.

The sending client 100 is provided with a CRT 160 as a display/output device, a keyboard 165 and mouse 170 as a input device, and floppy disc driver or CD-ROM driver as readable device with external recording media. The operation of the interface and units 110, 120, . . . , 155 will be described later with reference to FIG. 6. These operations can act according to program provided from external recording media. Next, the configuration of the web server 10 will be described with reference to FIG. 4.

The web server 10 contains a network control unit 12. The network control unit 12 connects a web server access transmitter/receiver 14, a search result transmitter 16, and a database access mechanism 18 to the network 30. The web server access transmitter/receiver 14 receives accesses to the web server 10 from the clients 100, 200, and transmits response to the accesses to the clients 100, 200. The search result transmitter 16 transmits back to the sending client 100 the telephone number 24, IP address 23, and mail address 25 as the data relating to the receiving client 200 that are obtained by searching the telephone directory database 20 in response to the search access which includes at least the name of the receiving operator from the sending client 100. The database access mechanism 18 accesses the telephone directory database 20. The operation of the foregoing units 12, . . . , 18 will be described later.

Figure 5:
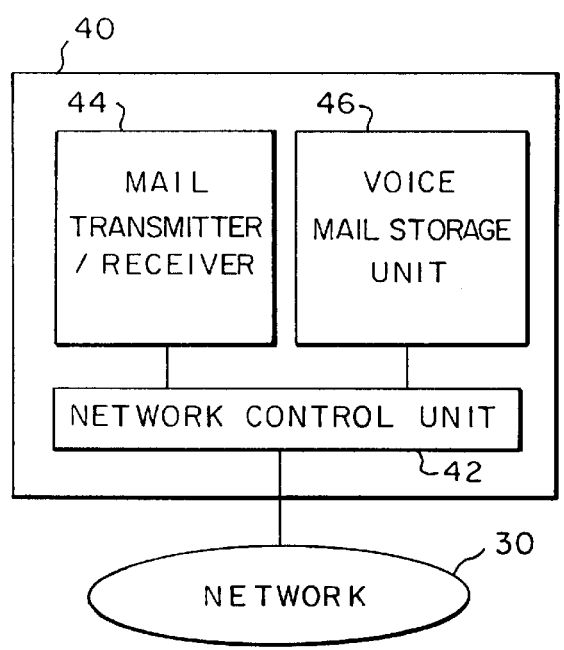
FIG. 5 is a block diagram illustrating a construction of a mail server used in the web phone dialer system according to one embodiment of the present invention.

Next, the configuration of the mail server 40 will be described with reference to FIG. 5.

The mail server 40 contains a network control unit 42. The network control unit 42 connects a mail transmitter/receiver 44 and a voice mail storage unit 46 to the network 30. The mail transmitter/receiver 44 executes reception and transmission of mail storage and retrieval of mail to and from the voice mail storage unit and control of the voice server. The voice mail storage unit 46 stores voice mails transmitted from the sending client 100. The operation of the foregoing units 42, . . . , 46 will be described later. Next, the operation of the web phone dialer system according to the embodiment will be described with reference to FIG. 6. First, a general access to the web will be described. At step 602, when the sending operator at the sending client 100 desires to call the receiving operator who uses the receiving client 200, the sending client 100 is connected to the web server 10 according to general access to the web system. The sending client 100 shown in FIG. 3 connects with the web server 10 from the web browser 125 through the network control unit 120 and the network 30. At step 632, the web server 10 transmits the web information requested (for example, a menu information of the telephone directory) back to the sending client 100 through the web server access transmitter/receiver 14 shown in FIG. 4. The web server 10 is connected to the network 30 by the network control unit 12 in advance. Receiving an access from the sending client 100, the web server 10 starts the web server access transmitter/receiver 14, and transmits the web information requested back to the sending client 100. At step 604, the sending client 100 inputs information on the assignment or name of the party to be called, which are selected out of the menu information of the telephone directory on the web. The input of the selected information is carried out, using the displays as shown in FIG. 7. In this flow although the web server presents guidance for inputting a name of receiving client, it is OK the client has the function. It can change occasionally.

Here, how to input the selected information will be described with reference to FIG. 7.

Figure 7A:
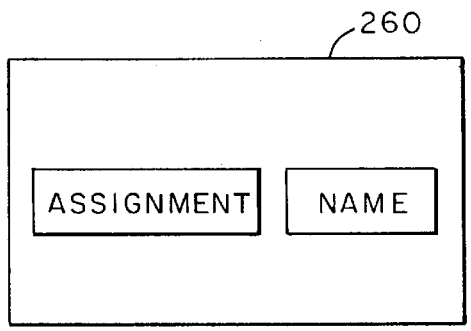
FIGS. 7A–E are schematic diagrams illustrating display screens that explain how to input selected information in the web phone dialer system according to one embodiment of the present invention.

The menu information of the telephone directory on the web is presented as shown in FIG. 7(A). FIG. 7(A) illustrates a display screen on the CRT 160 of the sending client 100 shown in FIG. 3. The display screen presents "assignment" and "name". The sending operator selects either one of them, using an input device such as the mouse 170 in FIG. 3. Usually, the sending operator selects "assignment" by clicking the mouse 170.

Figure 7B:
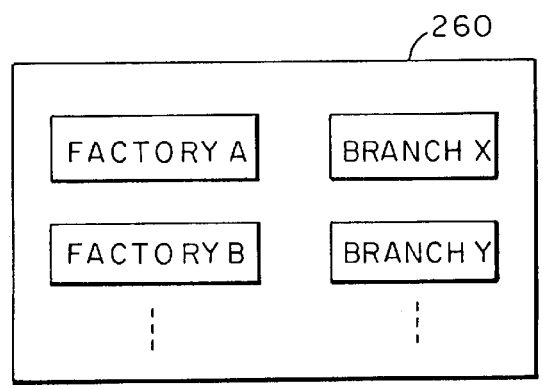

If "assignment" is selected, the web server "branch X" 10 transmits the web information shown in FIG. 7(B). The display presents assignments in a broad manner, such as "factory A", "factory B", . . . , "branch X", "branch Y", . . . . To this presentation, the sending operator selects the assignment corresponding to the receiving operator.

Figure 7C:
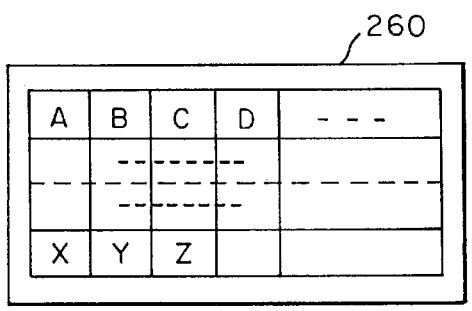

If the sending operator wants to call, for example, Mr. "Tanaka" belonging to "factory A", the operator selects "factory A", the web server 10 transmits the next web information as shown in FIG. 7(C). On the display, the web server 10 presents a set of alphabet, "A", . . . , "Z", and puts out a message to prompt the operator to input the first letter of the family name.

Figure 7D:
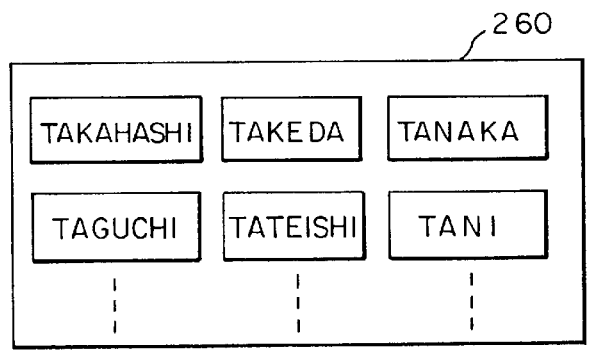
Figure 7E:
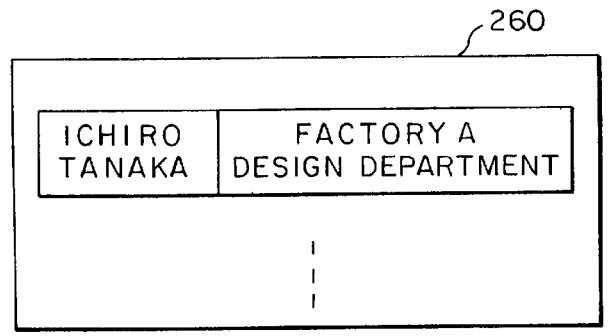

There, the operator selects "T" as the first letter of "Tanaka", and the web server 10 transmits the next web information as shown in FIG. 7(D). On the display, the web server 10 presents the family names of the personnel whose first letter involves "T", and who belong to "factory A". Next, as the operator selects "Tanaka", the web server 10 transmits the next web information as shown in FIG. 7(E). The web information displays a list of the full names of the personnels whose family name is "Tanaka" together with the assignments, as "Ichiro Tanaka, factory A design department". The operator selects the party to call from this list. Selecting, for example, "Ichiro Tanaka" (clicking the mouse on the name, for example) will complete to input the selected information of the party at step 604. Incidentally, at step 604, the assignment and name of the party may be inputted directly; however, the foregoing method will simplify the input of the party to call.

Next, at step 634, the web server 10 searches the database for the selected information. That is, the web server 10 searches the telephone directory database 20 having the data construction as shown in FIG. 2 through the database access mechanism 18 shown in FIG. 4. At step 636, hitting the information corresponding to the party, the web server 10 transmits the searched information to the sending client 100. That is, the search result transmitter 16 of the web server 10 transmits the information of the party such as the telephone number 24, IP address 23, and mail address 25 through the web server access transmitter/receiver 14 back to the sending client 100. At step 606, the sending client 100 receives the information. That is, the sending client 100 receives the information, the telephone number 24, IP address 23, and mail address 25, transmitted from the web server 10 through the web database receiver 130. Next, at step 608, the sending client 100 confirms the presence of the receiving operator. That is, the sending client 100 starts the application program 150. The application program 150 sends, using the presence/ absence confirmation unit 145, a request to confirm the presence or absence of the receiving operator on the basis of the received IP address through the network 30. At step 652, the receiving client 200 has the information as to presence or absence of the receiving operator registered in the internal presence/absence registration unit. The registration is made in such a manner that the receiving client 200 usually displays "presence" on the CRT display. However, when the operator leaves the location (being absent), the operator clicks "presence" to change it into "absence". Thus, the operator registers either the presence or absence in the presence/absence registration unit of the receiving client 200. The receiving client 200 sends back the information on either the presence or absence in response to the confirmation request from the sending client 100. Incidentally, if the receiving client 200 is not powered, the presence/absence confirmation unit 145 judges that the receiving operator is absent, when the confirmation request from the sending client 100 has not been responded to obtain a predetermined time.

The description hereunder will be divided into the case of the operator being present and the case of the operator being absent. First, the case of presence will be described. When the receiving operator is confirmed to be present by the return message from the receiving client 200, the application program 150 of the sending client 100 executes the automatic dialing at step 610. That is, the application program 150 transfers the telephone number 24 of the receiving client 200 received by the web database receiver 130 to the dial transmitter 155. The dial transmitter 155 transmits a call through the telephone interface 110 provided with the TAPI or TSAPI interface. When the sending client 100 connects to the receiving client 200, the operators on both sides are able to converse by using the handsets 105, or the like, at step 612 and step 654.

Next, the case of absence will be described. At step 614, the application program 150 of the sending client 100 executes the voice registration. That is, the application program 150 prompts the sending operator to perform the voice registration through the voice input unit, registers the message in the form of voice, and stores it as a file. At step 616, the application program 150 of the sending client 100 transmits the voice mail to the mail server 40. That is, using the mail address 25 of the receiving client 200 received by the web database receiver 130, the application program 150 transmits to the mail server 40 the voice mail (voice file registered) of the files stored by the mail transmitter/receiver 135. At step 672, the mail server 40 receives the mail. The mail server 40 receives the mail by the mail transmitter/receiver 44 through the network control unit 42, and stores it in the voice mail storage unit 46. Next, at step 674, the mail server 40 informs the receiving client 200 of the received mail.

When the operator of the receiving client 200 is present, the receiving operator releases the "absence" set by the presence/absence registration unit 140, and notices that mail from the mail server 40 has been received by the mail transmitter/receiver 135. If the mail is a text, the operator reads the content of the text, and if it is a voice mail, the operator listens to it through the telephone interface 110. Thus it becomes possible to communicate during absence. The operations described in a sending client column, which includes step 602 to step 616, and receiving client column, which includes step 652 to step 655, are performed by at least one program for each client. The program is stored in external recording media and installed to each client via floppy disc driver or CD-ROM driver 180.

As described above, the system searches the telephone number of the party to call by using the telephone directory database in which the telephone numbers are registered in correspondence with the assignments and names of the personnel and thereafter, transmits a call to the receiving client that the received party operates. The telephone directory database is controlled to be centralized, and the updated telephone number can always be obtained, even if the telephone number of the party is changed. Thus, the system can easily prevent the operator from calling a wrong number.

Further, using the IP address searched together with the telephone number, the system can confirm the presence or absence of the party in advance with the presence/absence confirmation unit of the receiving client. The system can prevent unnecessary calls during the party being absent. Further, while the party is absent, the system can send mail to the mail address obtained in advance, thereby the communication during absence to be easily made.

As described above, the system according to the invention allows the operator to easily call the party, even if the telephone number of the party has changed.

While the present invention has been described in detail and pictorially in the accompanying drawings, it is not limited to such details since many changes and modification recognizable to these of ordinary skill in the art may be made to the invention without departing from the spirit and scope of the invention, and all such modifications as would be obvious to one skilled in the art are intended to be included within the scope of the following claims.

We claim:

1. A web phone dialer system, which includes a web server and a plurality of clients connected to a network, comprising:

a telephone directory database which stores a database file in which a telephone number and its user identification information are handled as one record;

said web server comprises:

a first network control unit which controls communication between the network and the web server itself, and a database control unit which searches the database and transmits search results to the network via the first network control unit;

each of said clients comprises:

a second network control unit which controls communication between the network and the client, a transmitter which outputs user identification information of another user to said server and requests a telephone number of said another user corresponding to said user identification information, a receiver which receives search results of said database control unit corresponding to said user identification information outputted by said transmitter, and a dial transmitter which places a call to said another user using the telephone number received from said server without using said server.

2. A web phone dialer system according to claim 1, wherein said user identification information is a name of the user.

3. A web phone dialer system according to claim 1, said database file further includes IP address in each record;

said database control unit outputs ID address as search results; and said clients further comprises:

a register unit which registers presence or absence of an operator using its own client and outputs presence or absence in response to a request from another client, a confirmation unit which connects with another client used by an operator corresponding to said user identification information output by said transmitter by using said IP address, and confirms the presence or absence of said operator.

4. A web phone dialer system according to claim 3, said database file further includes a mail address in each record;
said database control unit outputs the mail address as search results; and
said clients further includes a mail transmitter which prompts to send mail to the operator corresponding to said user identification information output by said transmitter when the operator is absence.

5. A web phone dialer apparatus comprising:
a network control unit which controls communication between a network and the apparatus itself;
a telephone unit for connecting to a telephone network;
a transmitter which outputs user identification information of other apparatus to the network and requests a telephone number corresponding to said user identification information of said other apparatus;
a receiver which receives the telephone number of said other apparatus from the network; and
a dial transmitter which places a call to the telephone number received from said network without using said network.

6. A web phone dialer apparatus according to claim 5, further comprising:
an input device for inputting user identification information; and
a display device for displaying guidance to input the user identification information.

7. A web phone dialer apparatus according to claim 5, wherein said user identification information is a name of the user.

8. A web phone dialer apparatus according to claim 6, wherein said guidance includes guiding to input assignment, displaying names belonging to said assignment, and guiding to select one of the names, thereby said display device guides to input the user name.

9. A web phone dialer apparatus according to claim 5, a confirmation unit which confirms presence or absence of an user corresponding to said user identification information to the network.

10. A web phone dialer apparatus according to claim 9, wherein said confirmation unit comprising:
inquiry mechanism which request an IP address corresponding to said user identification information to the network;
a receive mechanism which receives the IP address from the network; and
a connect mechanism which connects with the IP address received form the network;
wherein the confirmation unit confirms presence or absence of the user.

11. A web phone dialer apparatus according to claim 9, further comprising:
a mail transmitter which prompts to send a mail to the user corresponding to said user identification information when the operator is absence.

12. A method for performing a web phone dial function executed by a computer having a telephone function and a network function, the method comprising the steps of:
displaying guidance to input user identification information;
receiving the user identification;
outputting the user identification information to a network and requesting a telephone number corresponding to user identification information of another user;
receiving the telephone number of said another user from the network; and
placing a call to the telephone number received from said network without using said network.

13. A method according to claim 12, wherein said displaying step comprising the steps of:
displaying a guidance to input user's assignment;
displaying names belonging to said assignment when said assignment is input; and
guiding to select one of the names.

14. A method according to claim 12 further comprising the step of:
confirming presence or absence of the user corresponding to said user identification information to the network.

15. A method according to claim 14 wherein said confirming step comprising the steps of:
requesting an IP address corresponding to said user identification information to the network;
receiving the IP address from the network;
connecting to the IP address received from the network; and
confirming the presence or absence of the user.

16. A method according to claim 12, further comprising the steps of:
prompting to send a mail to the user corresponding to said user identification information when the user is absence.

17. A web phone dialer system comprising:
a web server, which includes a telephone directory database storing a plurality of records each of which includes a telephone number and user identification information, for searching the database and transmitting search results in response to a search request;
a sending client for outputting as the search request user identification information of a web to the web server and placing a call to a telephone number received from said web server as the search result corresponding to the output user identification information; and
a receiving client which answers the call of said sending client without using said network.

18. A web phone dialer system according to claim 17, wherein said each record in the telephone directory database further including an IP address of a client being used by the user;
said sending client confirms presence/absence of the user by connecting to receiving client using the IP address received from the web server; and
said receiving client outputs data which indicates presence or absence of the user in response to a request from the sending client.

19. A web phone dialer system according to claim 18, wherein said each record in the telephone directory database further including a mail address of the user;
said sending client prompts an operator to send mail to the mail address received from the web server when the user is absence; and
said receiving client displays that the user has received the mail.

20. A computer program product stored on a computer readable medium for performing, when executed by a computer, a telephone dial function via a network, said computer program product comprising:

outputting means for outputting user identification information and requesting a telephone number corresponding to said user identification information to the network;

receiving means for receiving the requested telephone number from the network; and dial transmitting means for placing a call to the telephone number received from the network without using the network.

* * * * *